US012812374B2

(12) United States Patent
Sihotang

(10) Patent No.: US 12,812,374 B2
(45) Date of Patent: Nov. 24, 2026

(54) SIM AUTHENTICATION SERVICE

(71) Applicant: T-Mobile Innovations LLC, Overland Park, KS (US)

(72) Inventor: Jhon Sihotang, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 418 days.

(21) Appl. No.: 18/448,258

(22) Filed: Aug. 11, 2023

(65) Prior Publication Data

US 2025/0056224 A1 Feb. 13, 2025

(51) Int. Cl.

| | |
|---|---|
| ***H04W 12/06*** | (2021.01) |
| ***H04W 12/72*** | (2021.01) |
| ***H04W 84/12*** | (2009.01) |

(52) U.S. Cl.
CPC ........... *H04W 12/06* (2013.01); *H04W 12/72* (2021.01); *H04W 84/12* (2013.01)

(58) Field of Classification Search
CPC ..... H04W 12/06; H04W 12/72; H04W 84/12; H04W 12/084; H04W 12/40; H04W 4/24; H04L 63/0884; H04L 63/0892; H04L 12/14; G06Q 30/04
See application file for complete search history.

(56) References Cited

U.S. PATENT DOCUMENTS

| | | | | |
|---|---|---|---|---|
| 6,795,700 | B2 | 9/2004 | Karaoguz et al. | |
| 10,136,318 | B1 * | 11/2018 | Hancock | H04L 63/0876 |
| 2003/0051041 | A1 * | 3/2003 | Kalavade | H04W 12/084 709/229 |
| 2006/0073840 | A1 * | 4/2006 | Akgun | H04W 4/02 455/456.3 |
| 2006/0079228 | A1 | 4/2006 | Marsico et al. | |
| 2012/0084187 | A1 * | 4/2012 | Sperling | H04W 12/082 705/34 |
| 2015/0327065 | A1 | 11/2015 | Mildh et al. | |
| 2017/0223061 | A1 * | 8/2017 | Fiorillo | H04L 63/308 |
| 2017/0272317 | A1 * | 9/2017 | Singla | H04L 41/0806 |

OTHER PUBLICATIONS

Extended European Search Report in Copending EP Application No. 24194214.3, dated Dec. 19, 2024.

* cited by examiner

*Primary Examiner* — Brandon J Miller
(74) *Attorney, Agent, or Firm* — Jones Burke, PLLC

(57) ABSTRACT

A system for recording authentication requests for access to a Wi-Fi network. The system includes a processing node coupled to a processor. The processor is configured to receive, from a Wi-Fi access point, a request to authenticate a first wireless device for access via the Wi-Fi access point. The processor is further configured to transmit, to a billing processing node, a record of the request to authenticate the first wireless device.

20 Claims, 7 Drawing Sheets

SIM AUTHENTICATION SERVICE

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems.

In addition to cellular capabilities, many wireless devices can access the internet via a Wi-Fi hotspot. A Wi-Fi hotspot is a physical location where people can obtain Internet access via a wireless local-area network (WLAN). Hotspots may be created by commercial entities (e.g., Wi-Fi subscriber services) to provide Internet access at various locations for a fee (e.g., monthly). One approach to accessing the Internet using a wireless device involves allowing subscribed wireless devices to automatically join a Wi-Fi subscriber service whenever the wireless device is in range of a hotspot belonging to the Wi-Fi subscriber service. In other words, whenever a user enters an area in range of the Wi-Fi subscriber service, the wireless device connects to the Internet via the Wi-Fi subscriber service. This helps provide better bandwidth and services-on-demand than using only cellular network connections to access the Internet. A goal of these automatic connections is to enable cellular-like roaming among the Wi-Fi subscriber service's hotspots.

In order to prevent non-subscribers from using the Wi-Fi subscriber service, authentication of the wireless device is performed before allowing access to the Internet. One form of authentication involves using the subscriber identity module (SIM) associated with the wireless device.

Overview

Exemplary embodiments described herein include systems, methods, wireless devices, access nodes, and non-transitory computer readable mediums for recording Wi-Fi subscriber service authentication requests, by the cellular provider. Recorded authentication requests may then be used, by the cellular provider, as a basis for billing/charging the Wi-Fi subscriber service for its use of the cellular provider's authentication facilities. An exemplary method includes receiving, from a Wi-Fi access point, a request to authenticate a wireless device for access via the Wi-Fi access point. A record of the request to authenticate is then transmitted to a billing processing node.

An additional exemplary embodiment includes a system for recording authentication requests for access to a Wi-Fi network. The system includes a processing node coupled to a processor. The processor is configured to receive, from a Wi-Fi access point, a request to authenticate a wireless device for access via the Wi-Fi access point. The processor is further configured to transmit, to a billing processing node, a record of the request to authenticate the wireless device.

In yet a further exemplary embodiment, a non-transitory computer readable medium is provided for recording authentication requests. The non-transitory computer readable medium stores instructions executed by a processor to perform multiple operations. The operations include receiving, from a Wi-Fi access point, a request to authenticate a wireless device for access via the Wi-Fi access point. The operations further include transmitting, to a billing processing node, a record of the request to authenticate the wireless device.

DETAILED DESCRIPTION

Exemplary embodiments described herein include systems, methods, wireless devices, and computer readable mediums for recording the use of a cellular network provider's facilities by a Wi-Fi access network provider. Wi-Fi access networks may, for example, include a router/modem combination allowing wireless devices to connect to Wi-Fi and further to connect to the Internet. The cellular network provider may, for example, utilize 4G LTE or 5G RATs. Other RATs may alternatively or additionally be implemented. The cellular provider may maintain an association of Wi-Fi access networks that a particular subscriber identity module (SIM) is authorized to access. When a Wi-Fi access network queries the cellular provider to determine whether to allow a wireless device to connect to the Wi-Fi access network, the cellular provider may record the query. In this manner, the records of the Wi-Fi access network's queries may be used to bill/charge the Wi-Fi access network for these queries.

The term "wireless device" refers an end-user wireless device, which may communicate with both a cellular provider's network and Wi-Fi access points (i.e., hotspots). An exemplary system described herein includes at least an access node (or base station), such as an eNodeB, or gNodeB, as well as at least one authentication, authorization, and accounting (AAA) processing node, at least one billing processing node, and a plurality of end-user wireless devices. For illustrative purposes and simplicity, the disclosed technology will be illustrated and discussed as being implemented in the communications between a Wi-Fi hotspot and a cellular network provider's core network. It is understood that the disclosed technology may also be applied to communication between a Wi-Fi access network provider's facilities (e.g., routers, switches, etc.) and other network resources, such as relay nodes, controller nodes, antennas, etc. of the cellular network provider.

Figure 1:
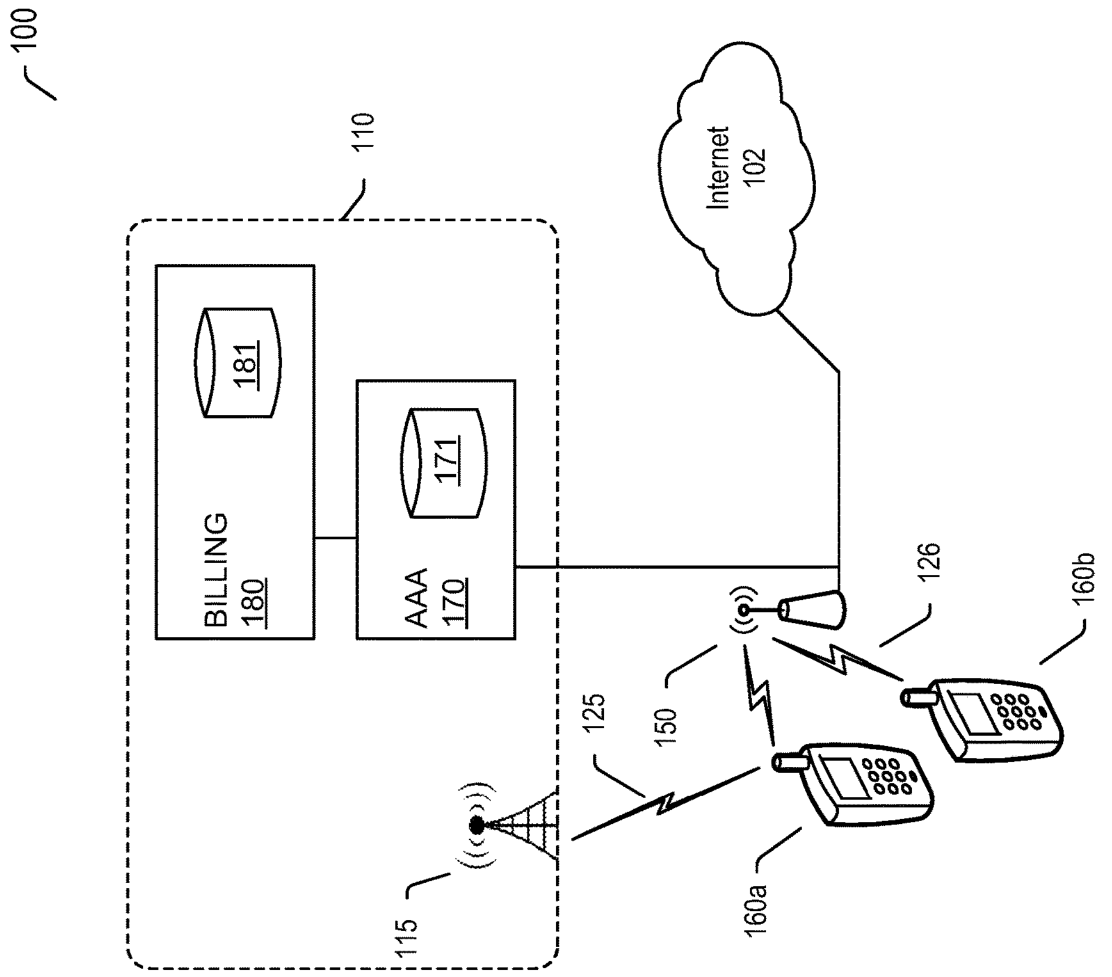
FIG. 1 depicts an exemplary system for wireless communication, in accordance with the disclosed embodiments.

FIG. 1 depicts an exemplary communication system 100. Communication system 100 includes cellular provider communication system 110, the Internet 102, Wi-Fi hotspot 150, wireless device 160*a*, and wireless device 160*b*. Cellular provider communication system 110 includes access node 115, AAA processing node 170, and billing processing node 180. Wi-Fi hotspot 150 is operatively coupled to cellular provider communication system 110 and the Internet 102. In particular, Wi-Fi hotspot 150 is operatively coupled to AAA processing node 170 of cellular provider communication system 100. AAA processing node 170 includes AAA database 171. Billing processing node 180 includes billing database 181.

Cellular provider communication system 110 may include a radio access network (RAN) (not shown in FIG. 1) that includes access node 115. Wireless devices 160*a*, 160*b* may be end-user wireless devices (e.g., UEs). The wireless links 125 may use 5G NR, 4G LTE, or any other suitable type of radio access technology (RAT) to communicate with cellular provider communication system 110, and access node 115, in particular, via a wireless link 125. Cellular provider communication system 110 can be structured as an evolved packet core (EPC) network or as a 5G core using a service-based architecture (SBA) utilizing core network functions and elements, including, for example, user plane functions (UPF) control plane functions (CPF). The cellular provider communication system 110 may optionally provide access to the Internet 102 (not shown in FIG. 1).

Cellular provider communication system 110 can include various access network functions and devices for communication to/from/with wireless devices 160*a*, 160*b*. For example, cellular provider communication system 110 includes at least an access node 115 (or base station), such as eNodeB and/or gNodeB communicating with the plurality of wireless devices 160*a*, 160*b*. It is understood that the disclosed technology may also be applied to communication between an end-user wireless device and other network resources, depending on the RAT and network technology being implemented. Further, cellular provider communication system 110 can include one or more of a local area network, a wide area network, and an internetwork (including the Internet) capable of communicating signals and carrying data, for example, to support voice, push-to-talk, broadcast video, and data communications by wireless devices 160*a*, 160*b*. Alternatively or additionally to the UPF and CPF, the illustrated network topology can include packet gateways, such as a CUPS based user plane S-GW, P-GW, or SAE-GW.

The cellular provider communication system 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

Wireless devices 160*a*, 160*b* may be any device, system, combination of devices, or other such communication platform capable of communicating wirelessly with cellular provider communication system 110 using one or more frequency bands deployed therefrom, and also capable of communicating wirelessly with Wi-Fi hotspot 150 via Wi-Fi wireless links 126. Each of wireless devices 160*a*, 160*b* may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via cellular provider communication system 110. Wireless devices 160*a*, 160*b* may also include, for example Internet of Things (IoT) devices. Although two wireless devices are illustrated in FIG. 1, any number of wireless devices may be included.

The Wi-Fi hotspot 150 may be or include a router or router/modem combination that deploys a wireless local area network (WLAN) capable of providing Internet 102 access via Wi-Fi to wireless devices 160*a*, 160*b*. Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

In an embodiment, before a given wireless device (e.g., wireless device 160*a*) is allowed to access the Internet 102 via Wi-Fi hotspot 150, Wi-Fi hotspot 150 queries cellular provider communication system 110 (and AAA processing node 170, in particular) to determine whether a wireless device (e.g., wireless device 160*a*) is authorized to use Wi-Fi hotspot 150 to access the Internet 102. A SIM associated with the wireless device (e.g., wireless device 160*a*) may be used to associate the wireless device (e.g., wireless device 160*a*) with one or more permissions, etc. stored in AAA database 171. In response to the query, AAA processing node 170 searches AAA database 171 for an indicator of whether the SIM associated with the wireless device (e.g., wireless device 160*a*) is authorized to communicate with the Internet 102 via Wi-Fi hotspot 150.

Also in response to the query, AAA processing node 170 transmits an indicator of the query (and optionally an identifier associated with Wi-Fi hotspot 150 and/or the operator of Wi-Fi hotspot 150) to billing processing node 180. Based on the indicator of the query (and optionally the identifier associated with Wi-Fi hotspot 150 and/or the operator of Wi-Fi hotspot 150) received from AAA processing node 170, billing processing node 180 stores an indicator of the query (e.g., a "query detail record") in billing database 181.

If AAA database 171 indicates the wireless device (e.g., wireless device 160*a*) is authorized to communicate with the Internet 102 via Wi-Fi hotspot 150, AAA processing node transmits an indicator to Wi-Fi hotspot 150 indicating Wi-Fi hotspot 150 should allow the wireless device (e.g., wireless device 160*a*) to communicate with the Internet via Wi-Fi hotspot 150. In response to receiving the indicator that Wi-Fi hotspot 150 should allow the wireless device (e.g., wireless device 160*a*) to communicate with the Internet via Wi-Fi hotspot 150, Wi-Fi hotspot 150 allows the wireless device (e.g., wireless device 160*a*) to communicate with the Internet 102 via Wi-Fi hotspot 150.

If AAA database 171 indicates the wireless device (e.g., wireless device 160*b*) is not authorized to communicate with the Internet 102 via Wi-Fi hotspot 150, AAA processing node transmits an indicator to Wi-Fi hotspot 150 indicating that Wi-Fi hotspot 150 should not allow the wireless device (e.g., wireless device 160*b*) to communicate with the Internet via Wi-Fi hotspot 150. In response to receiving the indicator that Wi-Fi hotspot 150 should not allow the wireless device (e.g., wireless device 160*b*) to communicate with the Internet via Wi-Fi hotspot 150, Wi-Fi hotspot 150 blocks at least some, or all, communication between the wireless device (e.g., wireless device 160*b*) and the Internet 102.

Figure 2:
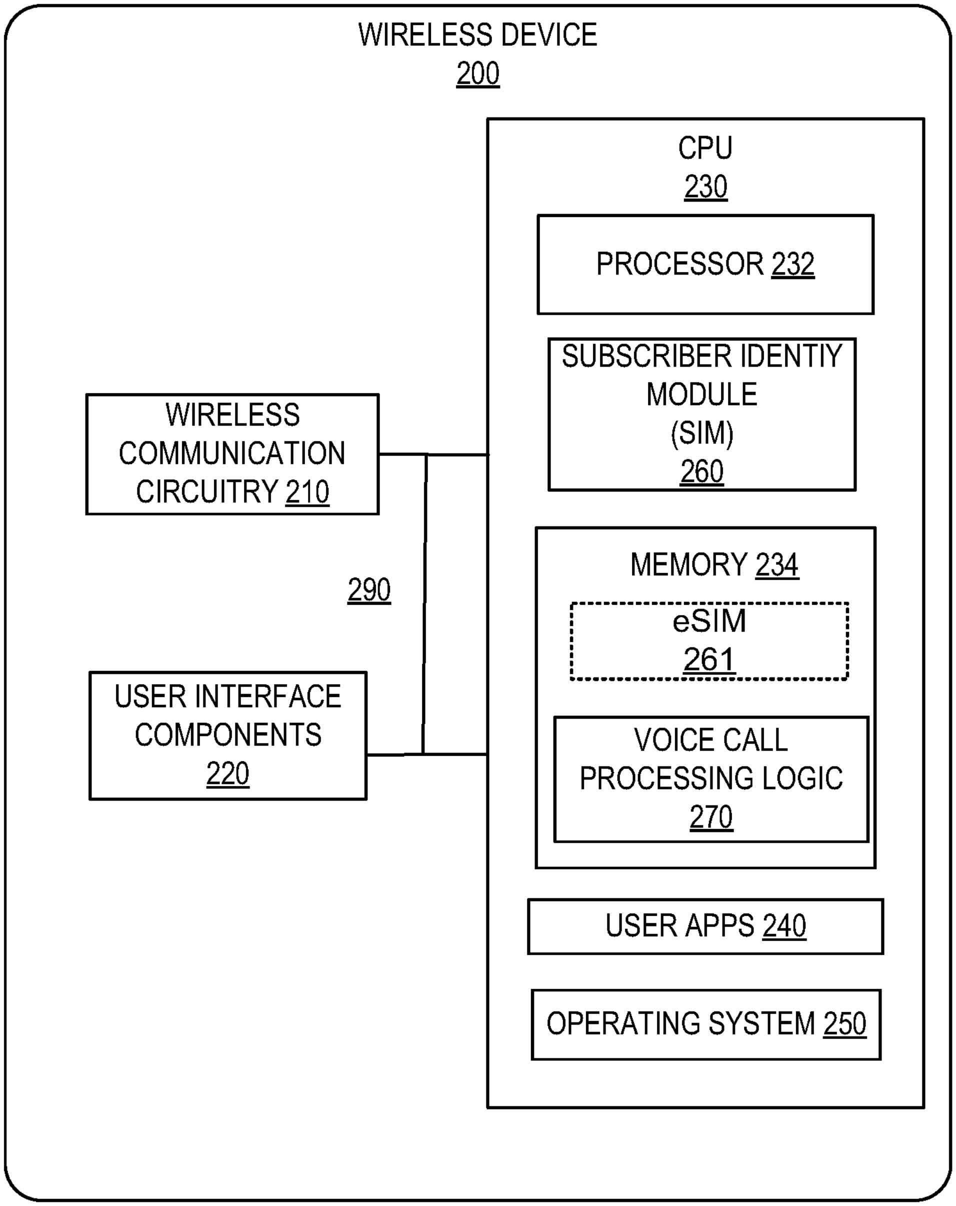
FIG. 2 depicts an exemplary wireless device in accordance with disclosed embodiments.

FIG. 2 depicts a wireless device (such as a UE) 200 in accordance with disclosed embodiments. The wireless device 200 may correspond to, or be a representation of the wireless devices 160*a*, 160*b* as shown in FIG. 1. As illustrated, the wireless device 200 includes wireless communication circuitry 210, user interface components 220, a central processing unit (CPU) 230, processor 232, memory 234, user apps 240, operating system 250, and SIM 260. In some embodiments, the functions of SIM 260 may be provided by an electronically stored SIM (eSIM) 261. Components may be connected, for example, by a bus 290. These components are merely exemplary and the wireless device 200 may include a larger or smaller number of components capable of performing the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The wireless communication circuitry 210 may include circuit elements configured to generate wireless signals (e.g., one or more antennas) as well as interface elements configured, for example, to translate control signals from the CPU 230 into data signals for wireless output. Further, the wireless communication circuitry 210 may include multiple elements, for example to communicate in different modes with different RATs. The CPU 230 may be configured to receive, interpret, and/or respond to signals received via the wireless communication circuitry 210. The CPU 230 may be configured to receive a network command (e.g., from cellular provider communication system 110) to perform other specified functions. The user interface components 220 may be or include any components enabling a user to interact with the wireless device 200, including tools for managing the voice call processing logic 270 and Wi-Fi settings of the wireless device 200 (e.g., information about whether wireless device 200 should communicate, or at least attempt to communicate, with the Internet 102 via Wi-Fi hotspot 150).

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 3:
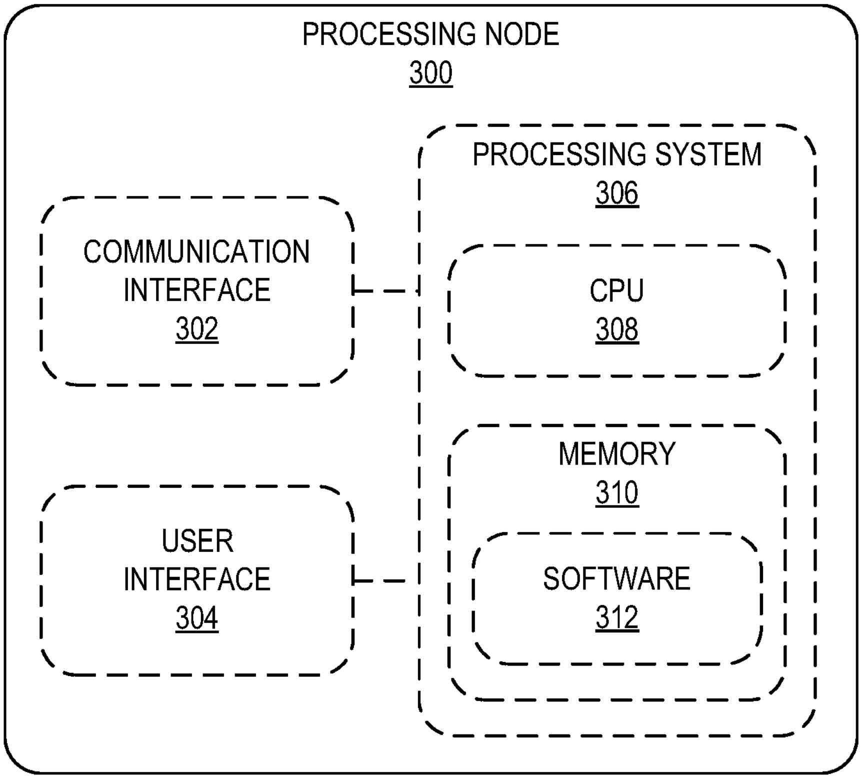
FIG. 3 depicts an exemplary processing node in accordance with disclosed embodiments.

FIG. 3 depicts an exemplary processing node 300 for processing authentication queries/requests (e.g., AAA processing node 170) and/or recording authentication requests (e.g., billing processing node 180). Processing node 300 comprises a communication interface 302, user interface 304, and processing system 306 in communication with communication interface 302 and user interface 304. Processing system 306 includes a central processing unit (CPU) 308, and a memory 310, which can comprise a disk drive, flash drive, memory circuitry, or other memory device. Memory 310 can store computer programs, firmware, or some other form of machine-readable instructions, including an operating system, utilities, drivers, network interfaces, applications, or some other type of software. Further, memory 310 can store software 312, which may be executed to perform the operations described herein. Processing system 306 may include other circuitry to retrieve and execute software 312 from memory 310. Processing node 300 may further include other components such as a power management unit, a control interface unit, etc., which are omitted for clarity. Communication interface 302 permits processing node 300 to communicate with other network elements. User interface 304 permits the configuration and control of the operation of processing node 300.

In an exemplary embodiment, software 312 includes instructions that enable processing node 300 to perform operations including receiving authentication queries for a Wi-Fi hotspot (e.g., Wi-Fi hotspot 150), searching an authentication database for authorization indicators (e.g., AAA database 171), transmitting authorization indictors to a Wi-Fi hotspot, and transmitting indicators of the authorization query to a billing processing node (e.g., billing processing node 180). In another exemplary embodiment, software 312 includes instructions that enable processing node 300 to receive information about an authorization query from a Wi-Fi hotspot (e.g., information about a query transmitted by Wi-Fi hotspot 150) and storing this information in a database (e.g., billing database 181).

Figure 4:
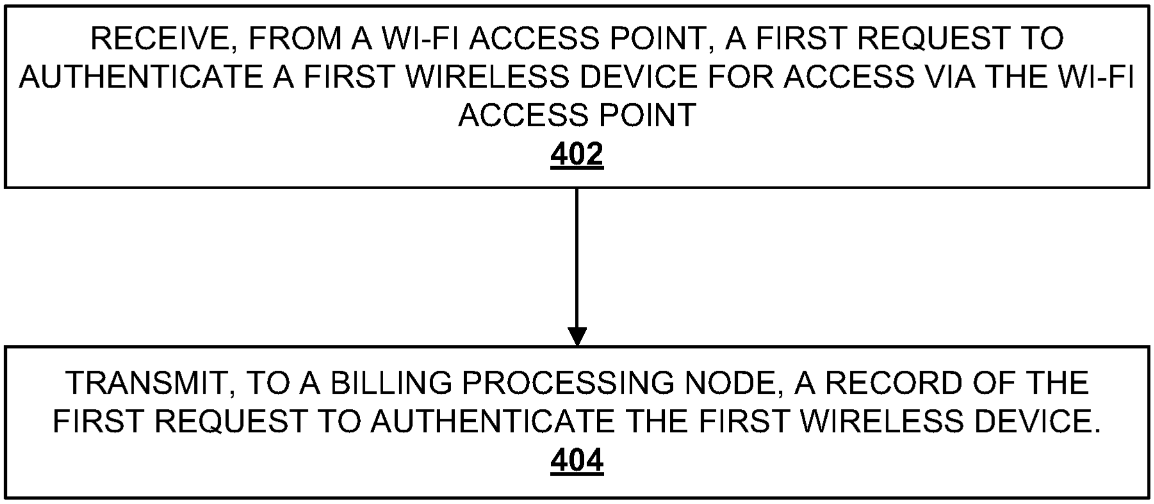
FIG. 4 is a flow chart illustrating a method for recording authentication requests in accordance with one disclosed embodiment.

FIG. 4 is a flow chart illustrating a method for recording authentication requests in accordance with one disclosed embodiment. The steps illustrated in FIG. 4 may be performed by one or more elements of communication system 100. From a Wi-Fi access point, a first request to authenticate a first wireless device for access via the Wi-Fi access point is received (402). For example, AAA processing node 170 may receive, from Wi-Fi hotspot 150, a query asking whether a wireless device (e.g., wireless device 160*a*) should be allowed to access the Internet 102 via Wi-Fi hotspot 150.

A record of the first request to authenticate the first wireless device is transmitted to a billing processing node (404). For example, AAA processing node 170 may transmit, to billing processing node 180, an indicator of the query (and optionally an identifier associated with Wi-Fi hotspot 150 and/or the operator of Wi-Fi hotspot 150) made by Wi-Fi hotspot 150 to billing processing node 180. Based on the indicator received from AAA processing node 170, billing processing node 180 may record an indicator of the query in billing database 181.

Figure 5:
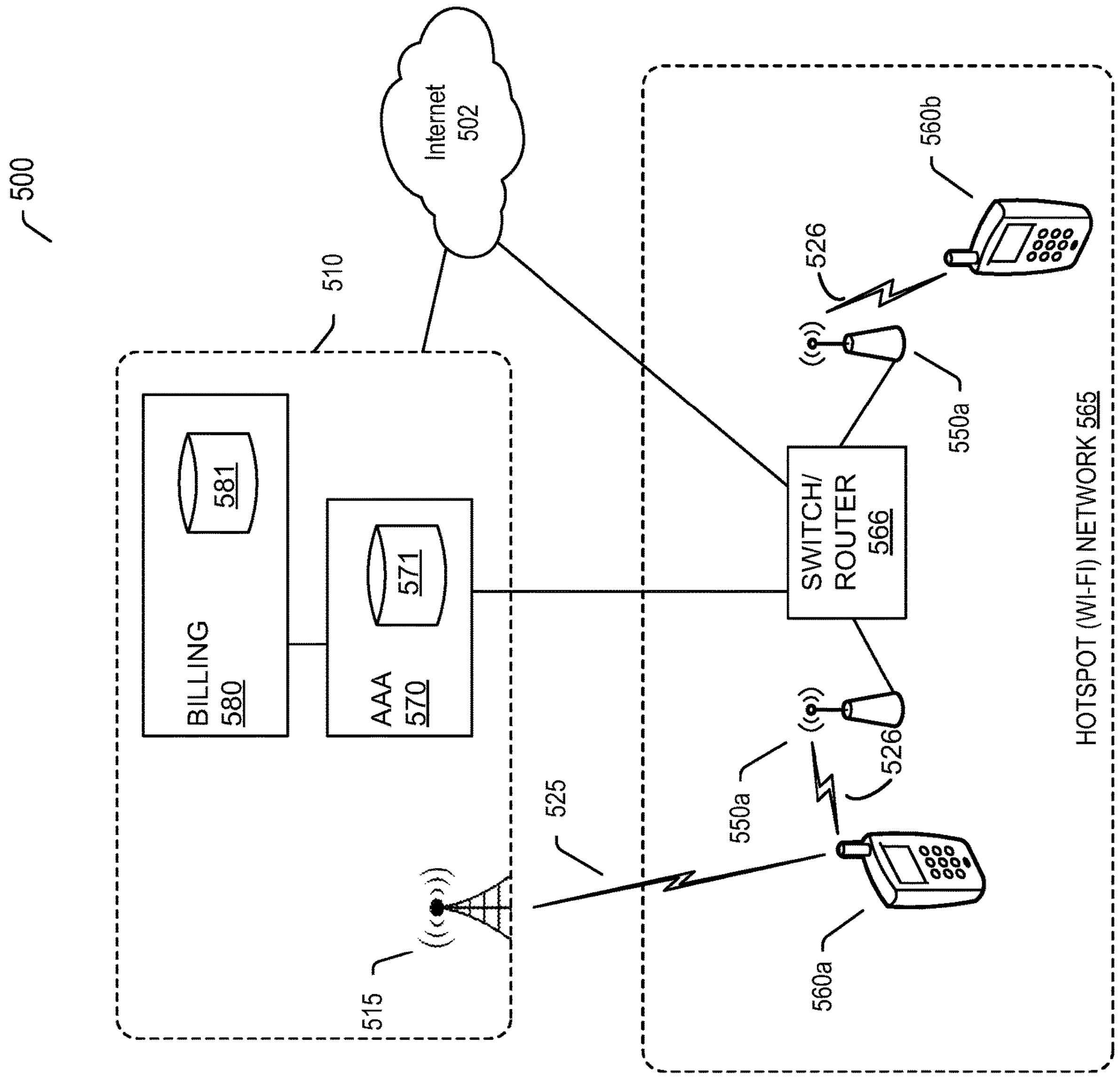
FIG. 5 depicts an exemplary system for wireless internet access, in accordance with the disclosed embodiments.

FIG. 5 depicts an exemplary system for wireless internet access, in accordance with the disclosed embodiments. Communication system 500 includes cellular provider network 510, the Internet 502, and Wi-Fi hotspot network 565. Cellular provider network 510 includes access node 515, AAA processing node 570, and billing processing node 580. Wi-Fi hotspot network 565 includes Wi-Fi access points (hotspots) 550*a*, 550*b*, switch/router 566, and wireless devices 560*a*, 560*b*. Wi-Fi access nodes 550*a*-550*b* are operatively coupled to cellular provider network 510 via switch/router 566. In particular, the elements of Wi-Fi hotspot network 565 are operatively coupled to AAA processing node 570 of cellular provider network 510. AAA processing node 570 includes AAA database 571. Billing processing node 580 includes billing database 581. Wi-Fi access nodes 550*a*-550*b* are also operatively coupled to the Internet 502 via switch/router 566.

Cellular provider network 510 may include a radio access network (RAN) (not shown in FIG. 5) that includes access node 515. Wireless devices 560*a*, 560*b* may be end-user wireless devices (e.g., UEs). The wireless links 525 use 5G NR, 4G LTE, or any other suitable type of radio access technology (RAT) to communicate with Cellular provider network 510, and access node 515, in particular, via a wireless link 525. Cellular provider network 510 can be structured as an evolved packet core (EPC) network or as a 5G core using a service-based architecture (SBA) utilizing core network functions and elements, including, for example, user plane functions (UPF) control plane functions (CPF). Cellular provider network 510 may provide access to the Internet 502 via wireless link 525.

Cellular provider network 510 can include various access network functions and devices for communication to/from/with wireless devices 560*a*, 560*b*. For example, Cellular provider network 510 includes at least an access node 515 (or base station), such as eNodeB and/or gNodeB communicating with the plurality of wireless devices 560*a*, 560*b*. It is understood that the disclosed technology may also be applied to communication between an end-user wireless device and other network resources, depending on the RAT and network technology being implemented. Further, cellular provider network 510 can include one or more of a local area network, a wide area network, and an internetwork (including the Internet) capable of communicating signals and carrying data, for example, to support voice, push-to-talk, broadcast video, and data communications by wireless devices 560*a*, 560*b*. Alternatively, or additionally to the UPF and CPF, the illustrated network topology can include packet gateways, such as a CUPS based user plane S-GW, P-GW, or SAE-GW.

Cellular provider network 510 may incorporate many functions not shown in FIG. 5. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

Wireless devices 560*a*, 560*b* may be any device, system, combination of devices, or other such communication platform capable of communicating wirelessly with cellular provider network 510 using one or more frequency bands deployed therefrom, and also capable of communicating wirelessly with Wi-Fi hotspot network 565 via Wi-Fi wireless links 526. Each of wireless devices 560*a*, 560*b* may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via cellular provider network 510. Wireless devices 560*a*, 560*b* may also include, for example Internet of Things (IoT) devices. Although two wireless devices are illustrated in FIG. 5, any number of wireless devices may be included.

The Wi-Fi hotspot network 565 may be or include a switch, router or router/modem combination that deploys a wireless local area network (WLAN) capable of providing Internet 502 access via Wi-Fi hotspot network 565 to wireless devices 560*a*, 560*b*. Other network elements may be present to facilitate communication but are omitted for clarity, such as base stations, base station controllers, mobile switching centers, dispatch application processors, and location registers such as a home location register or visitor location register. Components not specifically shown in FIG. 5 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

In an embodiment, before a given wireless device (e.g., wireless device 560*a*) is allowed to access the Internet 502 via Wi-Fi hotspot network 565, Wi-Fi hotspot network 565 queries cellular provider network 510 (and AAA processing node 570, in particular) to determine whether a wireless device (e.g., wireless device 560*a*) is authorized to use Wi-Fi hotspot network 565 to access the Internet 502. A SIM associated with the wireless device (e.g., wireless device 560*a*) may be used to associate the wireless device (e.g., wireless device 560*a*) with one or more permissions, etc. stored in AAA database 571. In response to the query, AAA processing node 570 searches AAA database 571 for an indicator of whether the SIM associated with the wireless device (e.g., wireless device 560*a*) is authorized to communicate with the Internet 502 via Wi-Fi hotspot network 565.

Also in response to the query, AAA processing node 570 transmits an indicator of the query (and optionally an identifier associated with Wi-Fi hotspot network 565 and/or the operator of Wi-Fi hotspot network 565) to billing processing node 580. Based on the indicator of the query (and optionally the identifier associated with Wi-Fi hotspot network 565 and/or the operator of Wi-Fi hotspot network 565) received from AAA processing node 570, billing processing node 580 stores an indicator of the query (e.g., a "query detail record") in billing database 581.

If AAA database 571 indicates the wireless device (e.g., wireless device 560*a*) is authorized to communicate with the Internet 502 via Wi-Fi hotspot network 565, AAA processing node transmits an indicator to Wi-Fi hotspot network 565 indicating Wi-Fi hotspot 550 should allow the wireless device (e.g., wireless device 560*a*) to communicate with the Internet via Wi-Fi hotspot network 565. In response to receiving the indicator that Wi-Fi hotspot network 565 should allow the wireless device (e.g., wireless device 560*a*) to communicate with the Internet via Wi-Fi hotspot network 565, Wi-Fi hotspot network 565 allows the wireless device (e.g., wireless device 560*a*) to communicate with the Internet 502 via Wi-Fi hotspot network 565.

If AAA database 571 indicates the wireless device (e.g., wireless device 560*b*) is not authorized to communicate with the Internet 502 via Wi-Fi hotspot network 565, AAA processing node transmits an indicator to Wi-Fi hotspot network 565 indicating that Wi-Fi hotspot network 565 should not allow the wireless device (e.g., wireless device 560*b*) to communicate with the Internet via Wi-Fi hotspot network 565. In response to receiving the indicator that Wi-Fi hotspot network 565 should not allow the wireless device (e.g., wireless device 560*b*) to communicate with the Internet via Wi-Fi hotspot network 565, Wi-Fi hotspot network 565 (e.g., switch/router 566) blocks at least some, or all, communication between the wireless device (e.g., wireless device 560*b*) and the Internet 502.

Figure 6:
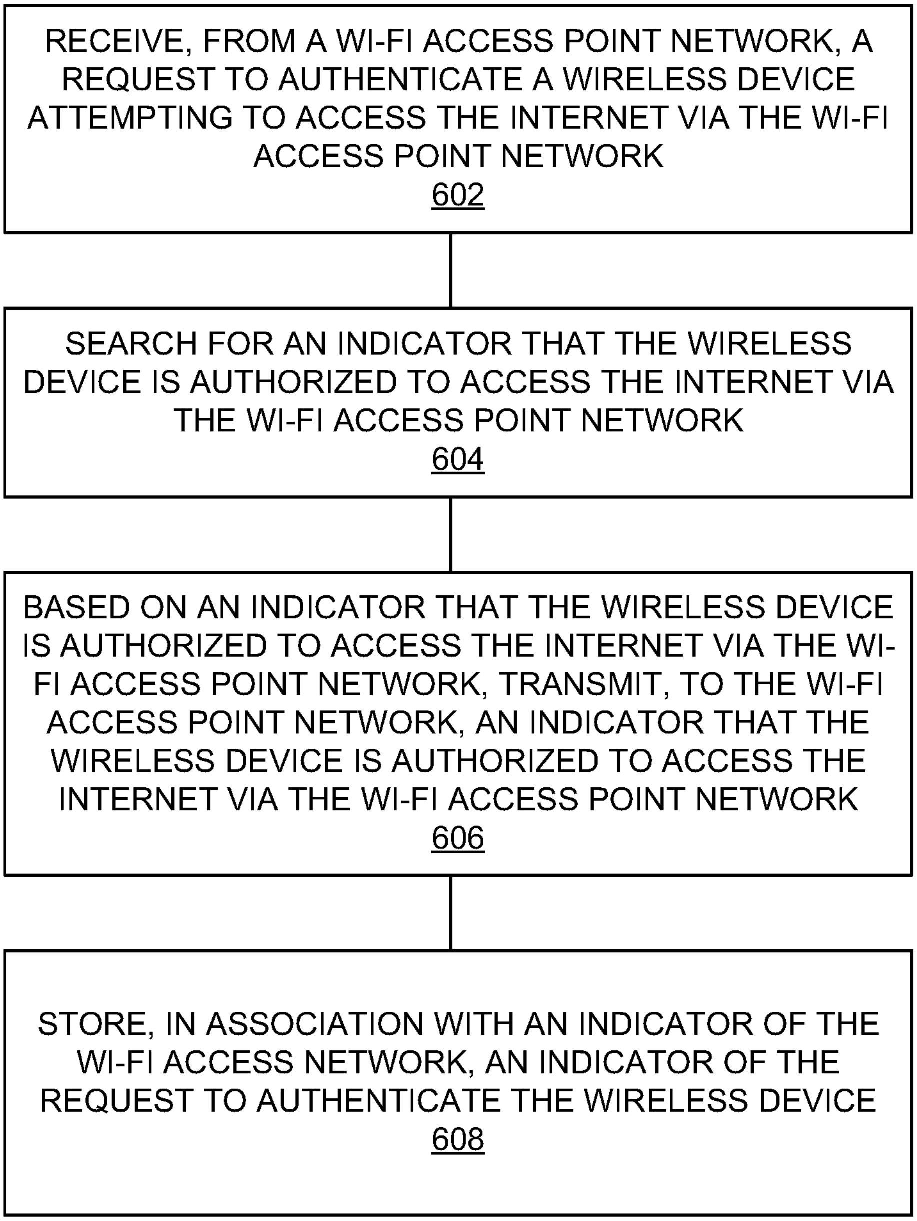
FIG. 6. is a flow chart illustrating a method of authenticating wireless devices for a Wi-Fi access network in accordance with another disclosed embodiment.

FIG. 6. is a flow chart illustrating a method of authenticating wireless devices for a Wi-Fi access network in accordance with another disclosed embodiment. The steps illustrated in FIG. 6 may be performed by one or more elements of communication system 100, and/or communication system 500. From a Wi-Fi access point network, a request to authenticate a wireless device attempting to access the internet via the Wi-Fi access point network is received (602). For example, AAA processing node 570 may receive, from Wi-Fi hotspot network 565, an indicator that wireless device 560*a* is attempting to connect to the Internet 502 via a Wi-Fi access point 550*a* of Wi-Fi hotspot network 565.

A search for an indicator that the wireless device is authorized to access the Internet via the Wi-Fi access point network is performed (604). For example, AAA processing node 570 may search AAA database 571 for an indicator that the SIM associated with wireless device 560*a* is associated with an account that is authorized to access the Internet 502 via Wi-Fi hotspot network 565. Based on an indicator that the wireless device is authorized to access the internet via the Wi-Fi access point network, an indicator that the wireless device is authorized to access the Internet via the Wi-Fi access point network is transmitted to the Wi-Fi access point network (606). For example, based on an entry in AAA database 571 indicating the SIM associated with wireless device 560*a* is authorized to access the Internet 502 via Wi-Fi hotspot network 565, AAA processing node 570 may transmit, to Wi-Fi hotspot network 565, an indicator that wireless device 560*a* is authorized to access the Internet 502 via Wi-Fi hotspot network 565.

An indicator of the request to authenticate the wireless device is stored in association with the indicator of the request to authenticate the wireless device (608). For example, billing processing node 580 may store, in billing database 581, and indicator of the request to authenticate wireless device 560*a* in association with an indicator that the request originated with Wi-Fi hotspot network 565.

Figure 7:
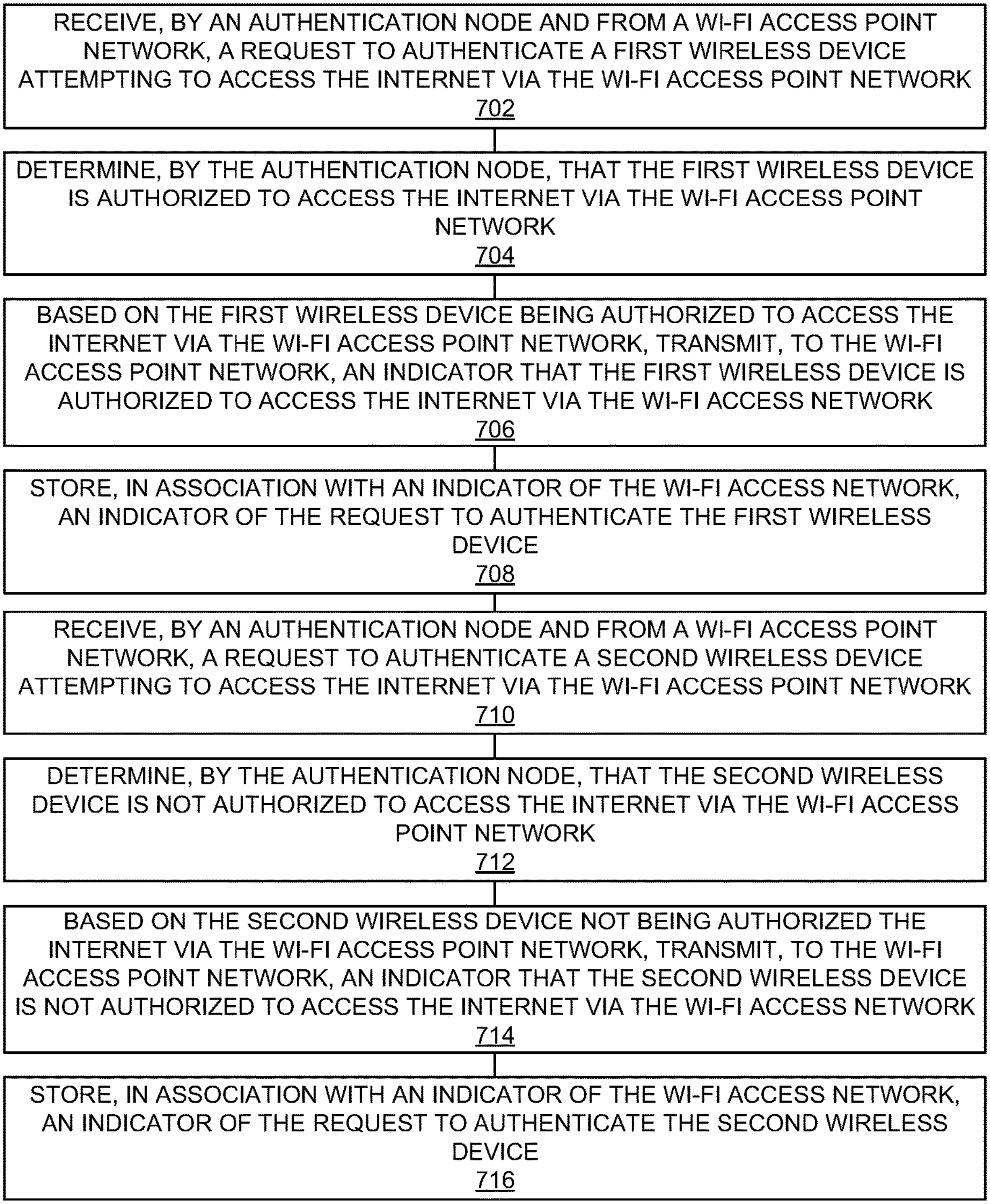
FIG. 7 is a flow chart illustrating a more detailed method for authenticating wireless devices for a Wi-Fi access network in accordance with a further disclosed embodiment.

FIG. 7 is a flow chart illustrating a more detailed method for authenticating wireless devices for a Wi-Fi access network in accordance with a further disclosed embodiment. The steps illustrated in FIG. 7 may be performed by one or more elements of communication system 100, and/or communication system 500. By an authentication node and from a Wi-Fi access point network, a request to authenticate a first wireless device attempting to access the internet via the Wi-Fi access point network is received (702). For example, AAA processing node 570 may receive, from Wi-Fi hotspot network 565 and indicator that wireless device 560*a* is attempting to connect to the Internet 502 via a Wi-Fi access point 550*a* of Wi-Fi hotspot network 565.

It is determined, by the authentication node, that the first wireless device is authorized to access the Internet via the Wi-Fi access point network (704). For example, AAA processing node 570 may search AAA database 571 for an indicator that the SIM associated with wireless device 560*a* is associated with an account that is authorized to access the Internet via Wi-Fi hotspot network 565 and based on an entry in AAA database 171 indicating the SIM associated with wireless device 560*a* is authorized to access the Internet via Wi-Fi hotspot network 565, AAA processing node 570 may determine that wireless device 560*a* is authorized to access the Internet 502 via Wi-Fi hotspot network 565. Based on the first wireless device being authorized to access the Internet via the Wi-Fi access point network, an indicator that the first wireless device is authorized to access the Internet via the Wi-Fi access network is transmitted to the Wi-Fi access point network (706). For example, based on the SIM associated with wireless device 560*a* being associated with being authorized to access the Internet 102 via Wi-Fi hotspot network 565, AAA processing node 570 may transmit, to Wi-Fi hotspot network 565, an indicator that wireless device 560*a* is authorized to access the Internet 502 via Wi-Fi hotspot network 565.

An indicator of the request to authenticate the first wireless device is stored in association with an indicator of the Wi-Fi access network (708). For example, billing processing node 580 may store, in billing database 581, and indicator of the request to authenticate wireless device 560*a* in association with an indicator that the request originated with Wi-Fi hotspot network 565.

By an authentication node and from a Wi-Fi access point network, a request to authenticate a second wireless device attempting to access the internet via the Wi-Fi access point network is received (710). For example, AAA processing node 570 may receive, from Wi-Fi hotspot network 565, an indicator that wireless device 560*b* is attempting to connect to the Internet 502 via a Wi-Fi access point 550*b* of Wi-Fi hotspot network 565.

It is determined, by the authentication node, that the second wireless device is not authorized to access the Internet via the Wi-Fi access point network (712). For example, AAA processing node 570 may search AAA database 571 for an indicator that the SIM associated with wireless device 560*b* is associated with an account that is authorized to access the Internet via Wi-Fi hotspot network 565, and based on the lack of an entry in AAA database 171 indicating the SIM associated with wireless device 560*b* is authorized to access the Internet via Wi-Fi hotspot network 565, AAA processing node 570 may determine that wireless device 560*b* is not authorized to access the Internet 502 via Wi-Fi hotspot network 565. Based on the second wireless device not being authorized to access the Internet via the Wi-Fi access point network, an indicator that the second wireless device is not authorized to access the Internet via the Wi-Fi access network is transmitted to the Wi-Fi access point network (714). For example, based on the SIM associated with wireless device 560*b* not being associated with being authorized to access the Internet 102 via Wi-Fi hotspot network 565, AAA processing node 570 may transmit, to Wi-Fi hotspot network 565, an indicator that wireless device 560*b* is not authorized to access the Internet 502 via Wi-Fi hotspot network 565.

An indicator of the request to authenticate the second wireless device is stored in association with an indicator of the Wi-fi access network (716). For example, billing processing node 580 may store, in billing database 581, and indicator of the request to authenticate wireless device 560*b* in association with an indicator that the request originated with Wi-Fi hotspot network 565.

In some embodiments, methods illustrated in FIGS. 4, 6, and/or 7 may include additional steps or operations. Furthermore, the methods may include steps shown in each of the other methods. As one of ordinary skill in the art would understand, the methods illustrated in FIGS. 4, 6, and/or 7 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

receiving, from a Wi-Fi access point, a first request to authenticate a first wireless device for access via the Wi-Fi access point;

in response to receiving the first request to authenticate, generating a query detail record representing the first request to authenticate the first wireless device, wherein the query detail record is associated with an identifier for the Wi-Fi access point; and transmitting, to a billing processing node, the query detail record of the first request to authenticate the first wireless device.

2. The method of claim 1, further comprising transmitting to the Wi-Fi access point, an indicator of that the first wireless device is to be allowed access via the Wi-Fi access point.

3. The method of claim 2, wherein the indicator that the first wireless device is to be allowed access via the Wi-Fi access point is based on a first subscriber identity module (SIM) associated with the first wireless device.

4. The method of claim 1, further comprising searching for an indicator that the first wireless device is associated with being allowed access via the Wi-Fi access point.

5. The method of claim 4, wherein searching for an indicator that the first wireless device is associated with being allowed access via the Wi-Fi access point comprises searching a database stored in a radio access network (RAN).

6. The method of claim 1, further comprising associating the query detail record of the first request to authenticate the first wireless device with an operator of the Wi-Fi access point.

7. The method of claim 4, further comprising:

receiving, from the Wi-Fi access point, a second request to authenticate a second wireless device for access via the Wi-Fi access point;

transmitting, to the billing processing node, a query detail record of the second request to authenticate the second wireless device, wherein the query detail record is associated with the identifier for the Wi-Fi access point; and transmitting to the Wi-Fi access point, an indicator of that the second wireless device is not to be allowed access via the Wi-Fi access point.

8. A system for recording authentication requests for access to a Wi-Fi network, the system comprising:

a processing node; and a processor coupled to the processing node, the processor being configured to perform operations comprising:

receiving, from a Wi-Fi access point, a first request to authenticate a first wireless device for access via the Wi-Fi access point;

in response to receiving the first request to authenticate, generating a query detail record representing the first request to authenticate the first wireless device, wherein the query detail record is associated with an identifier for the Wi-Fi access point; and transmitting, to a billing processing node, the query detail record of the first request to authenticate the first wireless device.

9. The system of claim 8, wherein the processor further executes instructions to transmit, to the Wi-Fi access point, an indicator of that the first wireless device is to be allowed access via the Wi-Fi access point.

10. The system of claim 9, wherein the indicator of that the first wireless device is to be allowed access via the Wi-Fi access point is based on a first subscriber identity module (SIM) associated with the first wireless device.

11. The system of claim 8, wherein the processor further executes instructions to:

receive, from the Wi-Fi access point, a second request to authenticate a second wireless device for access via the Wi-Fi access point;

transmit, to the billing processing node, a query detail record of the second request to authenticate the second wireless device, wherein the query detail record is associated with the identifier for the Wi-Fi access point; and transmit, to the Wi-Fi access point, an indicator of that the second wireless device is not to be allowed access via the Wi-Fi access point.

12. The system of claim 11, wherein the indicator that the second wireless device is not to be allowed access via the Wi-Fi access point is based on a second SIM associated with the second wireless device.

13. The system of claim 8, wherein the processor further executes instructions to search for an indicator that the first wireless device is associated with being allowed access via the Wi-Fi access point.

14. The system of claim 13, wherein the search for the indicator that the first wireless device is associated with being allowed access via the Wi-Fi access point comprises searching a database stored in a radio access network (RAN).

15. A non-transitory computer-readable medium, storing instructions executed by a processor to perform operations comprising:

receiving, from a Wi-Fi access point, a first request to authenticate a first wireless device for access via the Wi-Fi access point;

in response to receiving the first request to authenticate, generating a query detail record representing the first request to authenticate the first wireless device, wherein the query detail record is associated with an identifier for the Wi-Fi access point; and transmitting, to a billing processing node, the query detail record of the first request to authenticate the first wireless device.

16. The non-transitory computer-readable medium of claim 15, the operations further comprising transmitting to the Wi-Fi access point, an indicator of that the first wireless device is to be allowed access via the Wi-Fi access point.

17. The non-transitory computer-readable medium of claim 16, wherein the indicator that the first wireless device is to be allowed access via the Wi-Fi access point is based on a first subscriber identity module (SIM) associated with the first wireless device.

18. The non-transitory computer-readable medium of claim 15, the operations further comprising searching for an indicator that the first wireless device is associated with being allowed access via the Wi-Fi access point.

19. The non-transitory computer-readable medium of claim 18, wherein searching for an indicator that the first wireless device is associated with being allowed access via the Wi-Fi access point comprises searching a database stored in a radio access network (RAN).

20. The non-transitory computer-readable medium of claim 15, the operations further comprising:

receiving, from the Wi-Fi access point, a second request to authenticate a second wireless device for access via the Wi-Fi access point;

transmitting, to the billing processing node, a query detail record of the second request to authenticate the second wireless device, wherein the query detail record is associated with the identifier for the Wi-Fi access point; and transmitting to the Wi-Fi access point, an indicator of that the second wireless device is not to be allowed access via the Wi-Fi access point.

* * * * *